Patented Nov. 29, 1927.

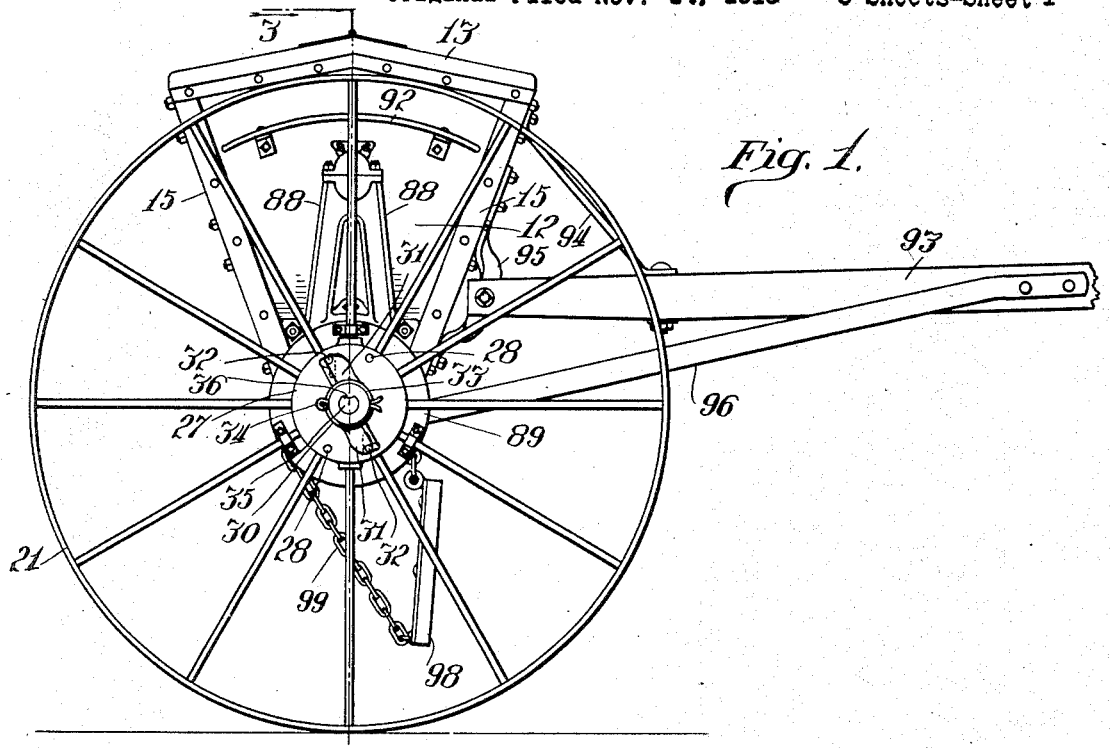

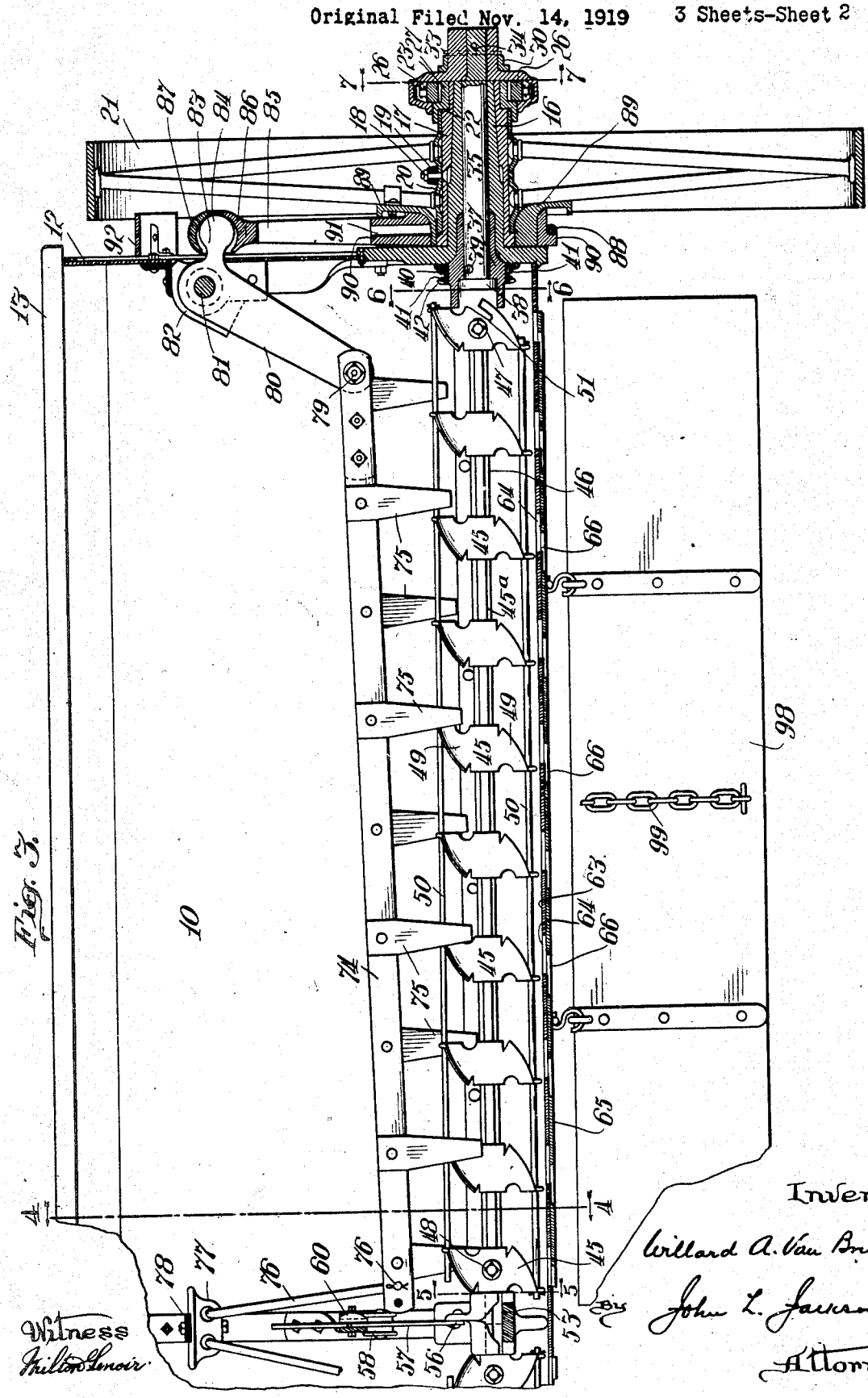

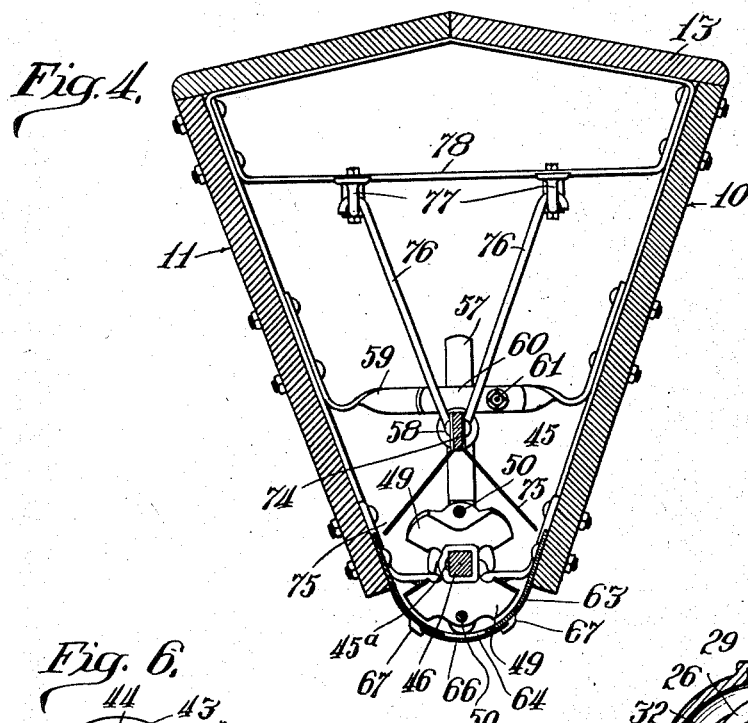
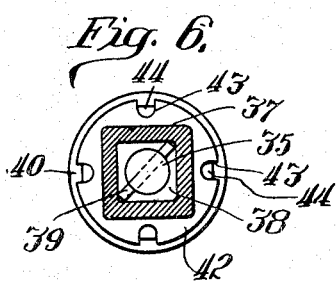
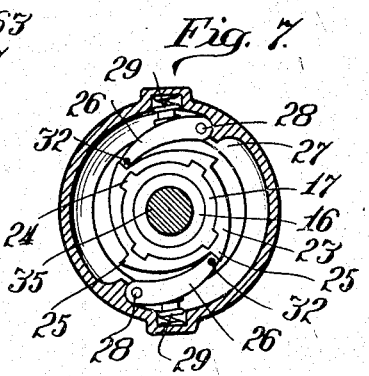
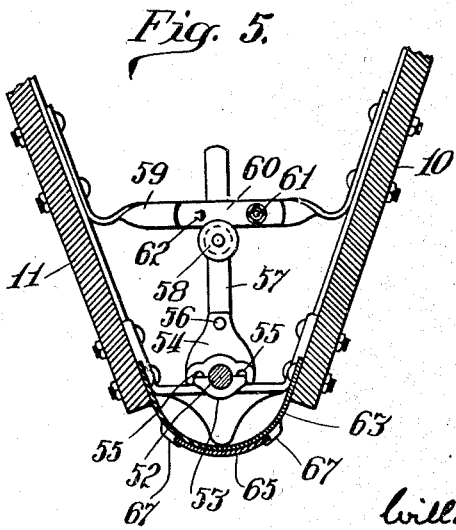

1,650,808

UNITED STATES PATENT OFFICE.

WILLARD A. VAN BRUNT, OF LOS ANGELES, CALIFORNIA, ASSIGNOR TO THE VAN BRUNT MANUFACTURING COMPANY, OF HORICON, WISCONSIN, A CORPORATION OF WISCONSIN.

MACHINE FOR SOWING FERTILIZERS.

Original application filed November 14, 1919, Serial No. 337,912. Divided and this application filed December 7, 1925. Serial No. 73,668.

My invention relates to machines for sowing or distributing commercial fertilizers, such as lime, crushed rock, ashes, &c. In such machines the fertilizer is usually placed in a hopper from which it is distributed by suitable feeding means and as it has a tendency to pack rather solidly in the hopper, due in part to the jolting of the machine as it is hauled over rough ground, it is necessary to provide agitators to keep the material loosened sufficiently to permit the feeding devices to discharge it regularly and evenly from the hopper. It is also desirable to so mount the feeding devices that they may be readily removed from the hopper for cleaning purposes. The objects of my invention are to provide improved means for agitating the fertilizer and to provide improved feeding devices adapted to cooperate therewith and mounted so that they may readily be removed from the hopper or other receptacle when it is desired to clean it. I accomplish these objects as illustrated in the drawings and as hereinafter described. What I believe to be new is set forth in the claims.

In the drawings,—

Fig. 1 is a side elevation of a machine embodying my invention;

Fig. 2 is a rear elevation of the machine, a portion of the machine being broken away;

Fig. 3 is an enlarged vertical section at line 3—3 of Fig. 1, showing the agitating means and feeding means in the right-hand half of the fertilizer receptacle, and illustrating, also, the details of the bearings for that one of the wheels from which power is derived for operating said means,—the left-hand portion of the machine being broken away;

Fig. 4 is a vertical section taken at line 4—4 of Fig. 3 illustrating the center bearing for the feeding devices and the swinging support for the inner end of the agitating means;

Fig. 5 is a detail, being a vertical section taken at line 5—5 of Fig. 3, and illustrating the center bearing in which are removably mounted the inner ends of the two alined shaft members of the feeding means;

Fig. 6 is a section taken on line 6—6 of Fig. 3, and illustrating the driving connection between the wheel-driven power shaft and the outer end of the feeding means at that side of the machine; and Fig. 7 is a section taken at line 7—7 of Fig. 3, and illustrating the details of the clutch between the wheel and the shaft that is mounted therein.

Referring to the several figures of the drawings,—the receptacle for containing the fertilizer material that is to be distributed is in the form of a hopper having downwardly converging side walls, the front wall of which is indicated by 10, the rear wall by 11, and the end walls by 12. The hopper will preferably be provided with a cover 13 hinged in place, as at 14, Fig. 1. The end walls are shown as connected to the front and rear walls by angle iron strips or plates 15. Secured to the lower part of each end wall 12 of the hopper is a hollow spindle 16 (see Fig. 3) upon which is journaled a sleeve 17 that is secured, in the construction shown, by a clamp bolt 18 and washer 19, to the hub of one of the two ground wheels 21.

In each longitudinal half of the hopper is located mechanism for agitating the material therein and feeding it therefrom, the said means in one half of the hopper being the duplicate of that in the other half, and therefore the description of one such set will suffice. In Fig. 3 are shown the agitating and feeding devices for the right-hand side of the machine, together with the means by which the same are operated from the right-hand carrying wheel 21, and at the other end of the machine a similar arrangement will be employed. Each of the two sets of feeding devices—that is the one at the right-hand side of the machine and that at the left-hand side of the machine—is located in the lower portion of the hopper, and each is driven from its adjacent wheel through clutch and drive shaft mechanism which will now be described. The outer end portion of the sleeve 17 is provided with a shoulder, as indicated at 22, against which rests a driving ring 23. As best shown in Fig. 7, the sleeve 17 has a plurality of lugs 24 that fit in correspondingly-shaped recesses formed in the driving ring 23, whereby the ring will be positively moved as the sleeve is rotated. The outer edge of the ring 23 is provided with a plurality of teeth 25 with which two oppositely-located dogs 26 carried by a plate 27 cooperate. These dogs are pivotally mounted upon the plate 27, as indicated at 28, and are normally held in position to engage with the teeth 25 by coiled springs 29. To disengage the dogs 26 from the teeth 25 a rotatable shifting cam device 30 is employed, such cam device being located on a hub of the plate 27, as clearly shown in Fig. 3. The shifting device 30 is provided with two oppositely-located cams 31—31 (see Fig. 1) which engage respectively with pins 32 formed on the dogs 26, and thereby press the dogs outwardly about their pivots 28 against the pressure of the coiled springs 29. The pins 32 project through short slots in the plate 27, as indicated in Fig. 1, so that they may be engaged as stated by said cams. With the dogs thus moved out of engagement with the teeth 25 the supporting wheel 21 will not turn the plate 27, but when such dogs are in engagement with the teeth of the plate, as in Fig. 7, the plate then will be positively driven with the wheel. A coiled spring 33 (see Fig. 3) is interposed between a cotter pin 34 and the shifting device 30, which spring acts frictionally to hold said shifting device in the position to which it may be manually adjusted.

35 indicates a shaft which extends through and is journaled in the hollow spindle 16. The outer end of said shaft is made fast in any suitable manner to the hub of the plate 27 so that such shaft is positively revolved with the plate. The connection of these parts may be by the usual lug and recess construction, as indicated at 36 in Fig. 1. The cotter pin 34, hereinbefore referred to, that passes through the hub of the plate 27 and through the shaft 35 prevents lateral shifting of one part relatively to the other. 37 indicates a rotatable member mounted on the shaft 35 and having its outer end inserted in an annular recess at the inner end of the bore of the spindle. The inner end of the rotatable member 37 projects into the interior of the hopper, as clearly shown in Fig. 3, such end being enlarged and provided with a squared socket into which extends the end of the feeding device hereinafter referred to. The socketed member 37 is detachably connected with the shaft 35, so as to rotate therewith, by means of a pin 39 that extends through the shaft and has its projecting ends fitting in recesses formed in the corners of the socket 38, as clearly shown in Fig. 6. 40 indicates a washer surrounding the socketed member 37 and preventing dust and grit from passing from the receptacle into the bearing of such member 37 and to the shaft 35 in the spindle. It is held against a vertical flange on the spindle by a coiled spring 41, the other end of the spring bearing against a flange 42 formed on the outer face of the member 37.

In order to insure the turning of the washer with the member 37, the flange 42 is provided with several recesses, as shown in Fig. 6, into which project lugs 44 integral with the washer.

The machine is provided, as hereinbefore stated, with separate feeding devices and agitating devices for each longitudinal half of the machine,—each of such sets of devices being constructed and arranged as shown in Fig. 3, wherein the right-hand set is illustrated, the devices for each half being operatively connected with the adjacent carrying wheel of the machine, as shown in said figure, and as hereinafter described. Providing a separate feeding device and agitating means for each half of the machine, as stated, is of very great advantage in some phases of the machine's operation. For example, when finishing up "lands", or working in fields where there are "point" rows, it is possible to throw the feeding device at one side of the machine out of operation by shifting the cam ring 30 that opens the clutch, thereby economizing by avoiding double spreading or sowing of the fertilizing material.

Each feeding device consists of a number of separated members 45 held in spaced relation upon a rotatable shaft 46, and in the construction shown (see Fig. 4) each member 45 is secured against movement longitudinally of the shaft by a wedge 45ᵃ driven into a notch in the hub of the member, but any other suitable means may be employed for securing them to the shaft. In addition to being secured by a wedge 45ᵃ the end members 45 are further secured to the shaft, in the construction shown, by bolts, the bolt for the outer member being indicated by 47 and that for the inner member by 48. Each member 45 has formed with its hub portion two oppositely-disposed wings 49 that so act upon the fertilizing material in the hopper as to force it toward and through discharge openings in the bottom of the hopper. The various feed members 45 are connected together by two rods 50, 50, that extend parallel with the shaft 46 and pass through openings formed in marginal portions of the wings. The member 45 at the outer end of each shaft differs from the other members carried by such shaft in that it is provided with a squared central projection 51 that fits within the socket 38 of the member 37, whereby the feeding device as a whole will be rotated when the socketed member 37 rotates. The inner end of the shaft 46 is cylindrical, as indicated at 52 in Fig. 5, to form a bearing which is supported in a boxing 53 located substantially centrally of the length of the hopper and midway between the front and rear walls thereof. The upper half of the boxing is indicated by 54, and is removable so as to permit the feeding device as a whole to be quickly and easily removed when desired. By reference to Fig. 5 it will be noted that the upper half 54 of the boxing is provided with lips 55 that extend down over the edges of the boxing member 53, such construction aiding in holding the upper half of the boxing from displacement. Pivotally connected to the upper boxing member 54, at 56, is a hand lever 57, upon one face of which is rotatably mounted a flanged roller 58 that is normally in engagement with the lower edge of a cross-bar 59 that extends between the sides of the hopper. The lever 57 is normally held in an upright position by a spring clip 60, one end of which is secured to the cross-bar 59, as at 61. Said spring clip has a lug 62 pressed out from its inner face, which lug acts as a latch to hold the lever 57 in place when such lever is in upright position between the cross-bar 59 and the spring 60. It is frequently desirable to clean out the hopper between periods of use to prevent the caking or hardening of material therein, and the construction and arrangement of the parts described permit the ready removal of each feeding device as a whole to facilitate such cleaning operation. When this is to be done the spring clip 60 will be forced away from the cross-bar 59 sufficiently to permit the lever to be disengaged from the latch 62, whereupon the lever will be turned on its pivot 56 sufficiently to carry it from between the latch and the cross-bar. When the lever has been so turned and the roller 58 moved away from engagement with the edge of the cross-bar, it is evident that the upper half 55 of the boxing can then be withdrawn, after which either one of the feeding devices as a whole can be removed from the hopper by lifting its inner end slightly and then drawing it longitudinally of the hopper sufficiently to withdraw the squared shoulder 51 from the socket 38 in the member 37. As clearly shown in Fig. 3, the boxing 53, 54 is wide enough to receive and properly hold the inner cylindrical ends or journals of both of the shafts 46, and hence by the operation of the single lever 57 both of such shafts can be rotatably locked in place, or released from the boxing so as to permit of withdrawal in the manner described.

63 indicates the hopper bottom, which is preferably formed from a sheet metal plate extending the full length of the hopper and rounded to conform substantially to the radius of the wings 49 of the feeding device. At intervals throughout its length the bottom plate 63 is provided with discharge openings 64, which are located directly beneath the feeding members 45 so that as the material within the hopper is stirred and carried around by such members it will drop or be forced out through such openings. 65 indicates a metal plate provided with openings 66 adapted to register with the openings in the hopper bottom. This plate is supported in longitudinal guides 67 carried by the hopper bottom and preferably pressed out therefrom, and, as will be understood, by adjusting such plate 65 as required it will act as a valve to regulate the size of the discharge openings in the hopper bottom, and consequently the amount of material to be discharged therethrough can be varied as desired. This plate or valve 65 is shifted by means of a hand lever 68 (see Fig. 2) pivotally mounted at 69 upon the outer face of the rear wall of the hopper, the connection of the lower end of the lever with the plate being by means of a link 70 secured to the plate at 71 and to the lever at 72. 73 is the usual index device attached to the rear wall of the hopper,—the position of the lever on such index device indicating the extent to which the feed openings are in alinement, or in other words showing the rate of distribution per acre.

Fertilizing materials, such as crushed rock, lime, ashes, &c., that are commonly carried in machines of this character, have a tendency to pack rather solidly in the hopper, and then bridge within the hopper above the feeding devices. It is necessary, therefore, that means be provided for keeping the material agitated over the feeding devices. In the construction shown a separate agitating means is employed in each longitudinal half of the machine, just as in the case of feeding devices. Each of these agitating means is connected with and operated from one of the supporting wheels, and as they are alike, a description of one of them will suffice. In Fig. 3 is shown the agitating means employed at the right hand side of the machine, and, as there shown, such means comprises a bar 74 having secured thereto at regular intervals downwardly diverging fingers 75 which lie over and alongside of the feeding devices, as clearly shown in Fig. 4. As best shown in said figure the inner end of the bar 74 is swingingly supported by two links 76, 76 each mounted in an eye 77 secured to a brace 78 that extends across the upper portion of the hopper and is bolted to the front and rear walls thereof, so that said links swing longitudinally of the hopper. As shown in Fig. 3, this cross-bar is located at substantially the longitudinal center of the hopper and affords support for the links that are employed in connection with the agitating means in each half of the machine. The outer end of the bar 74 is pivoted at 79 to the lower portion of the long arm 80 of a bell crank lever that is pivoted at 81 to a bracket 82 secured to the inner face of the end wall 12 of the hopper. The short arm of the bell crank is indicated by 83, and as clearly shown in Fig. 3 it extends through a slot in said end wall, and at its outer end is formed to provide a substantially spherical head 84. Connected with the head 84 is an eccentric-rod or pitman 85 which is provided with a socket bearing to receive said head. The lower half of this socket is formed integral with the pitman 85 and is indicated by 86; the upper half of the socket is in the form of a cap indicated by 87 which is clamped to the pitman by a truss rod 88 (see Fig. 1),—the screw-threaded ends of this truss-rod passing through flanges of the two-part socket, as shown in Fig. 1, and being secured in place by nuts, and the central portion of such rod extending around and beneath the pitman 85, as shown in Fig. 3. The reciprocation of the eccentric-rod or pitman is effected by an eccentric 89 that is clamped to the spokes of the ground wheel 21, the lower end of the pitman being provided with a large bearing or eccentric-strap 90 that surrounds the eccentric. As the wheel turns, it of course carries the eccentric 89 with it, thereby actuating the eccentric-rod or pitman and causing a rocking of the bell-crank about the pivot 81, which in turn reciprocates the agitating means so as to cause a thorough stirring of the mass of fertilizer material in the hopper. It will be noted that the link 76 and arm 80 by which the opposite ends of the agitator bar 74 are suspended converge downwardly. Consequently, as said agitator bar is reciprocated by the rocking of the arm 80 the opposite ends thereof have a relative vertical movement, or, in other words, said bar rocks about a transverse axis that shifts lengthwise of the hopper, but always occupies an intermediate position with respect to the ends thereof. This compound movement of the agitator bar causes its arms 75 to effectively stir and break up the material in the hopper so that it may be fed properly by the feeding devices carried by the shaft 46. By reason of the downwardly-diverging disposition of said arms 75 they may be placed quite close to the feeding devices without danger of their striking the same when the agitator bar is moved up and down or endwise, and their proximity to the feeding devices causes them to operate more effectively in loosening up the material passing to said feeding devices. By connecting the agitator bar 74 to the bell-crank lever as described power is applied to said agitator bar in the most direct and positive manner for moving it. 91 is an oil passage in the bearing or eccentric-strap 90. 92 is a shield bolted to the end wall 12 of the hopper above the ball and socket bearing of the pitman and bell-crank to prevent dirt carried by the wheel from falling directly upon such bearing. 93 is a draft pole rigidly secured to the hopper by braces 94, 95, and 96 indicates another brace extending outwardly and downwardly from the tongue and secured to a bracket extending forwardly from one of the spindle members 16. A brace such as 96 will be employed at each side of the tongue. 97 indicates braces for reenforcing the walls of the hopper, and 98 indicates a hinged deflector board pivotally swung from the lower ends of braces, such as 97, that are secured to the front wall of the hopper. The angular position of said board can be adjusted by means of a chain 99 which engages a suitable hook carried by one of the rear braces 97. The object of the board 98 is to prevent light fertilizer, such as dry lime and ashes, from being blown by the wind while it is falling from the openings in the bottom of the hopper to the ground.

By the construction described I provide a machine which, while adapted to deliver fertilizer over an area as wide as the length of the hopper, may have the feeding mechanism in one half of the hopper readily and quickly thrown out of action without disturbing the corresponding feeding mechanism in the other half. Furthermore, by such construction a machine is provided wherein the separate feeding devices at opposite sides of the longitudinal center of the hopper are separately connected up for driving purposes with the adjacent supporting wheels, and are so connected with the wheels that, when desired, either or both of the feeding devices may be very quickly detached and removed, thus facilitating the thorough cleaning of the hopper so as to prevent the caking or solidifying of material that might occur if it were allowed to remain during the times when the machine was not in operation. Prior to removing the feeding device the agitator that is suspended above it should, of course, be removed, which, as will be evident from an inspection of Fig. 3, can be very readily and easily accomplished.

The spindle bearing construction hereinbefore described is not claimed herein as it constitutes the subject-matter of my pending application for patent Serial No. 337,912, filed November 14, 1919, of which this is a division.

What I claim as my invention and desire to secure by Letters Patent, is—

1. In a machine of the class described, the combination with a hopper having feed openings in the lower portion thereof, of an agitator bar extending longitudinally of said hopper, agitating devices carried by said bar, means suspending said bar in the hopper and operable to rock said bar about a shiftable transverse axis to move the end portions thereof vertically relatively to each other, and means for actuating said agitator bar.

2. In a machine of the class described, the combination with a hopper having feed openings in the lower portion thereof, of an agitator bar extending longitudinally of said hopper, agitating devices carried by said bar, means suspending said bar in the hopper and operable to reciprocate said bar and simultaneously rock the same about a shiftable transverse axis to move the end portions thereof vertically relatively to each other, and means for actuating said agitator bar.

3. In a machine of the class described, the combination with a hopper having feed openings in the lower portion thereof, of an agitator bar extending longitudinally of said hopper, agitating devices carried by said bar, means suspending said bar in the hopper and operable to rock said bar about an intermediate transverse axis to move the end portions thereof vertically relatively to each other, feeding means in the lower portion of the hopper, means for actuating said feeding means, and means for actuating said agitator bar.

4. In a machine of the class described, the combination with a hopper having feed openings in the lower portion thereof, of an agitator bar extending longitudinally of the hopper, agitating devices carried by said bar, means supporting said agitator bar and operable to move the same longitudinally and simultaneously rock the same substantially about an intermediate transverse axis, a feeder shaft in the lower portion of the hopper, means for rotating said shaft, and means for actuating said agitator bar.

5. In a machine of the class described, the combination with a hopper having feed openings in the lower portion thereof, of an agitator bar extending longitudinally of said hopper, downwardly diverging agitating devices carried by said bar, means suspending said bar in the hopper and operable to reciprocate said bar and simultaneously rock the same to move the end portions thereof vertically relatively to each other, and means for actuating said agitator bar.

6. In a machine of the class described, the combination with a hopper having feed openings in the lower portion thereof, of an agitator bar extending longitudinally of said hopper, downwardly converging members suspended in said hopper to swing longitudinally thereof and supporting said agitator bar and operable to rock said bar about a transverse axis to move the end portions thereof vertically relatively to each other, agitating devices carried by said bar, and means for actuating said agitator bar.

7. In a machine of the class described, the combination with a hopper having feed openings in the lower portion thereof, of an agitator bar extending longitudinally of said hopper, downwardly converging members suspended in said hopper to swing longitudinally thereof and supporting said agitator bar and operable to reciprocate said bar and simultaneously rock the same to move the end portions thereof vertically relatively to each other, agitating devices carried by said bar, feeding means in the lower portion of the hopper, and means for actuating said agitator bar.

8. In a machine of the class described, the combination with a hopper having feed openings in the lower portion thereof, of an agitator bar extending longitudinally of the hopper, downwardly-diverging agitating arms carried by said bar, downwardly converging members suspended in said hopper to swing longitudinally thereof and supporting said agitator bar, feeding means in the hopper below said agitator bar, and means for actuating said agitator bar.

9. A machine of the class described, comprising in combination a hopper, a wheel adjacent to one end of said hopper, a feeding device rotatable about an axis extending longitudinally of the hopper, an agitator adapted to be reciprocated longitudinally of said hopper, means connected with said wheel and with said feeding device for rotating the feeding device, and means connected with said wheel and with said agitator for reciprocating the agitator.

10. A machine of the class described, comprising a hopper having feed openings in the lower portion thereof, a shaft extending longitudinally in the lower portion of said hopper, feeding means carried by said shaft, an agitator bar extending longitudinally of the hopper above said shaft, agitating means carried by said bar, means supporting said agitator bar and operable to move the same longitudinally and simultaneously rock the same substantially about a transverse axis, a wheel adjacent to one end of said hopper and rotatable about an axis extending longitudinally thereof, means connected with said wheel and with said shaft and operable by said wheel to rotate said shaft, and means connected with said wheel and with said agitator bar and operable by said wheel to actuate said bar.

11. In a machine of the class described, the combination with a hopper having feed openings in the lower portion thereof, of a shaft disposed longitudinally in the lower portion of the hopper, means carried by said shaft for delivering fertilizing material through said openings, means for rotating said shaft, and agitating means mounted in said hopper above said shaft, said agitating means comprising a bar disposed longitudinally of the hopper, means supporting said bar for longitudinal and up and down movement, and downwardly and outwardly extending arms carried by said bar above and adjacent to said feeding means, and means for actuating said bar.

12. In a machine of the class described, the combination with a hopper having feed openings in the lower portion thereof, of a shaft disposed longitudinally in the lower portion of the hopper, means carried by said shaft for delivering fertilizing material through said openings, means for rotating said shaft, and agitating means mounted in said hopper above said shaft, said agitating means comprising a bar disposed longitudinally of the hopper, a depending link supported at the upper portion of the hopper to swing longitudinally thereof, said link being connected with one end portion of said bar, and an arm pivotally supported at the other end of the hopper to swing longitudinally thereof and supporting the opposite end of said bar, and means for swinging said arm.

13. In a machine of the class described, the combination with a hopper having feed openings in the lower portion thereof, of a shaft disposed longitudinally in the lower portion of the hopper, means carried by said shaft for delivering fertilizing material through said openings, means for rotating said shaft, and agitating means mounted in said hopper above said shaft, said agitating means comprising a bar disposed longitudinally of the hopper, a depending link supported at the upper portion of the hopper to swing longitudinally thereof, said link being connected with one end portion of said bar, and an arm pivotally supported at the other end of the hopper to swing longitudinally thereof and supporting the opposite end of said bar, said link and arm being arranged to converge downwardly, and means for actuating said bar.

14. In a machine of the class described, the combination with a hopper having feed openings in the lower portion thereof, of a shaft disposed longitudinally in the lower portion of said hopper, means carried by said shaft for delivering fertilizing material through said feed openings, bearings detachably supporting the end portions of said shaft, one of said bearings comprising upper and lower separable members, means connected with the hopper and supporting the lower bearing member, means within the hopper and operable from above for detachably securing the upper bearing member in operative relation to the lower bearing member, and means for rotating said shaft.

15. In a machine of the class described, the combination with a hopper having downwardly converging side walls and feed openings in the lower portion of the hopper, of a shaft disposed longitudinally in the lower portion of said hopper, means carried by said shaft for delivering fertilizing material through said feed openings, bearings detachably supporting the end portions of said shaft, one of said bearings comprising upper and lower separable members, means connected with the side walls of the hopper and supporting the lower bearing member, means within the hopper and operable from above for detachably securing the upper bearing member in operative relation to the lower bearing member, and means at one end of the hopper for rotating said shaft.

16. In a machine of the class described, the combination with a hopper having feed openings in the lower portion thereof, of a shaft disposed longitudinally in the lower portion of said hopper, means carried by said shaft for delivering fertilizing material through said feed openings, a bearing detachably supporting one end portion of said shaft, a bearing for the other end portion of said shaft comprising upper and lower separable members, means connected with the hopper for supporting the lower bearing member, means pivotally connected with the upper bearing member and operable from above either to release said member or to secure it in operative relation to the lower bearing member, and means for rotating said shaft.

17. In a machine of the class described, the combination with a hopper having feed openings in the lower portion thereof, of a shaft disposed longitudinally in the lower portion of said hopper, means carried by said shaft for delivering fertilizing material through said feed openings, a bearing detachably supporting one end portion of said shaft, a bearing for the other end portion of said shaft comprising upper and lower separable members, means connected with the hopper for supporting said lower bearing member, an upwardly projecting arm pivotally connected with the upper bearing member, a cross-bar connected with the hopper and adapted to cooperate with said arm to hold said upper bearing member in operative position, said arm being movable relatively to said cross-bar to release said upper bearing member, and means for rotating said shaft.

18. In a machine of the class described, the combination with a hopper having feed openings in the lower portion thereof, of a shaft disposed longitudinally in the lower portion of said hopper, means carried by said shaft for delivering fertilizing material through said feed openings, a bearing detachably supporting one end portion of said shaft, a bearing for the other end portion of said shaft comprising upper and lower separable members, means connected with the hopper for supporting said lower bearing member, an upwardly projecting arm pivotally connected with the upper bearing member, a cross-bar connected with the hopper and adapted to cooperate with said arm to hold said upper bearing member in operative position, said arm being movable relatively to said cross-bar to release said upper bearing member, means carried by said cross-bar for locking said arm in operative position, and means for rotating said shaft.

19. In a machine of the class described, the combination with a hopper having feed openings in the lower portion thereof, of a shaft disposed longitudinally in the lower portion of said hopper, means operating by the rotation of said shaft to deliver fertilizing material through said feed openings, a rotatable member at one end of the hopper having a non-circular socket adapted to receive one end of said shaft, means for rotating said member, a bearing for the other end portion of said shaft comprising upper and lower separable members, means secured to the hopper for supporting said lower bearing member, and means within the hopper connected with the upper bearing member and operable from above either to secure said bearing member in operative position or to release the same, whereby by detaching said upper bearing member said shaft may be withdrawn from the hopper.

20. In a machine of the class described, the combination with a hopper having feed openings in the lower portion thereof, of a shaft disposed longitudinally in the lower portion of said hopper, means operating by the rotation of said shaft to deliver fertilizing material through said feed openings, a rotatable member at one end of the hopper having a non-circular socket adapted to receive one end of said shaft, means for rotating said member, a bearing for the other end portion of said shaft comprising upper and lower separable members, means secured to the hopper for supporting said lower bearing member, an upwardly-extending arm pivotally connected with the upper bearing member to swing transversely of the hopper, a cross-bar connected to the side walls of the hopper and extending across the same adjacent to said bar, and a roller carried by said arm and adapted to engage said cross-bar when said arm is in operative position, to hold said upper bearing member in operative relation to the lower bearing member.

21. A machine of the class described, comprising in combination a hopper, a ground wheel adjacent to one end of said hopper and rotatable about an axis extending longitudinally thereof, a rotatable feeding device and a reciprocatable agitator bar located in and extending longitudinally of said hopper with the bar above the feeding device and both arranged in substantially the same vertical plane as the axis of the wheel, means, including clutch mechanism, at one side of said wheel for rotating said feeding device, and means connected with the opposite side of said wheel for reciprocating said agitator.

22. A machine of the class described, comprising in combination a hopper, a ground wheel adjacent to one end of said hopper and rotatable about an axis extending longitudinally thereof, a rotatable feeding device in said hopper with its axis in substantial alinement with the axis of the wheel, an endwise-movable agitator bar extending longitudinally of the hopper and swingingly supported above said feeding device and in approximately the same vertical plane, means, including clutch mechanism, at one side of said wheel for rotating said feeding device, and means connected with the opposite side of said wheel for giving an endwise rocking movement to said agitator bar.

23. A machine of the class described, comprising in combination a hopper, a wheel adjacent to one end of said hopper, a rotatable feeding device in said hopper, in substantial alinement with the axis of the wheel, an endwise-movable agitator bar swingingly supported above said feeding device and in approximately the same vertical plane, a plurality of downwardly-diverging fingers carried by said bar projecting toward the bottom of the hopper at opposite sides of the feeding device, and separate means connected respectively with opposite sides of said wheel for rotating said feeding device and giving an endwise rocking movement to said agitator bar.

24. A machine of the class described, comprising in combination a hopper, a ground wheel adjacent to one end thereof and rotatable about an axis extending longitudinally of the same, a rotatable feeding device and an agitator bar located in and extending longitudinally of said hopper with the bar above the feeding device and both arranged in substantially the same vertical plane as the axis of the wheel, means, including clutch mechanism, at one side of said wheel for rotating said feeding device, and means connected with the opposite side of said wheel for imparting to said agitator bar both a longitudinal movement and an up-and-down movement.

WILLARD A. VAN BRUNT.